United States Patent
Usmani

(10) Patent No.: US 8,943,236 B1
(45) Date of Patent: Jan. 27, 2015

(54) PACKET SCHEDULING USING A PROGRAMMABLE WEIGHTED FAIR QUEUING SCHEDULER THAT EMPLOYS DEFICIT ROUND ROBIN

(75) Inventor: Ozair Usmani, San Jose, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 235 days.

(21) Appl. No.: 13/166,749

(22) Filed: Jun. 22, 2011

Related U.S. Application Data

(60) Provisional application No. 61/499,686, filed on Jun. 21, 2011.

(51) Int. Cl.
*G06F 3/00* (2006.01)
*G06F 13/00* (2006.01)

(52) U.S. Cl.
USPC ......... 710/20; 710/6; 710/21; 710/31; 710/33

(58) Field of Classification Search
CPC ......... G06F 13/18; G06F 13/26; G06F 13/30; G06F 3/225
USPC ..................... 710/20, 6, 21, 31, 33
See application file for complete search history.

(56) References Cited

U.S. PATENT DOCUMENTS

| | | | | |
|---|---|---|---|---|
| 5,487,066 A * | 1/1996 | McNamara et al. | .......... | 370/436 |
| 6,665,725 B1 * | 12/2003 | Dietz et al. | ..................... | 709/230 |
| 7,299,282 B2 * | 11/2007 | Sarkissian et al. | ............ | 709/224 |
| 7,881,303 B2 * | 2/2011 | Hughes et al. | ............. | 370/395.4 |
| 2006/0136570 A1 * | 6/2006 | Pandya | .......................... | 709/217 |
| 2007/0150631 A1 * | 6/2007 | Druke et al. | .................. | 710/244 |
| 2007/0165647 A1 * | 7/2007 | Kenney et al. | ............. | 370/395.4 |
| 2007/0291645 A1 * | 12/2007 | Ryu et al. | ...................... | 370/235 |
| 2009/0086628 A1 * | 4/2009 | Gracon et al. | ................ | 370/230 |
| 2009/0109846 A1 * | 4/2009 | Sinha | .......................... | 370/230.1 |
| 2009/0245246 A1 * | 10/2009 | Veeragandham et al. | .... | 370/389 |

* cited by examiner

*Primary Examiner* — Idriss N Alrobaye
*Assistant Examiner* — Getente A Yimer
(74) *Attorney, Agent, or Firm* — Sterne, Kessler, Goldstein & Fox P.L.L.C.

(57) ABSTRACT

The disclosed packet scheduler implements the deficit round robin (DRR) approximation of weighted fair queuing (WFQ), and is capable of achieving complete fairness across several hundred source flows, for example, each of which can be mapped to one of several destination ports. In addition to achieving fairness, the packet scheduler allows the user to map one or more optional strict-priority flows to each port. The packet scheduler keeps these strict-priority flows "outside" of the group of flows for which fairness is enforced. Each destination port can be optionally configured to chop its data packets into sub-packet pieces. The packet scheduler works in two mutually orthogonal dimensions: (1.) it selects destination ports based on a round-robin scheme, or using another method, such as guaranteed rate port scheduling (GRPS), and (2.) it implements optional strict-priority scheduling, and DRR scheduling.

20 Claims, 13 Drawing Sheets

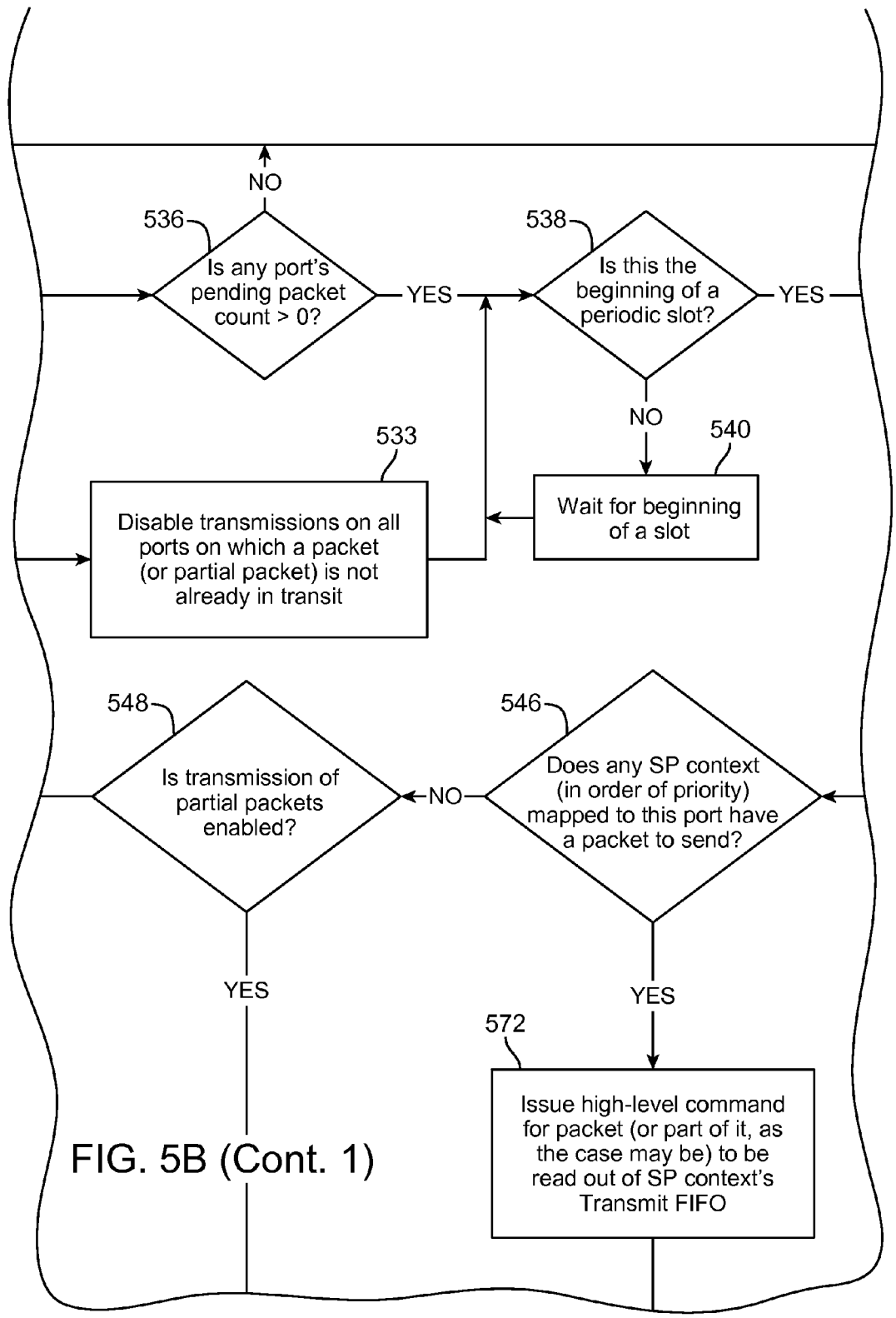
FIG. 5B (Cont. 1)

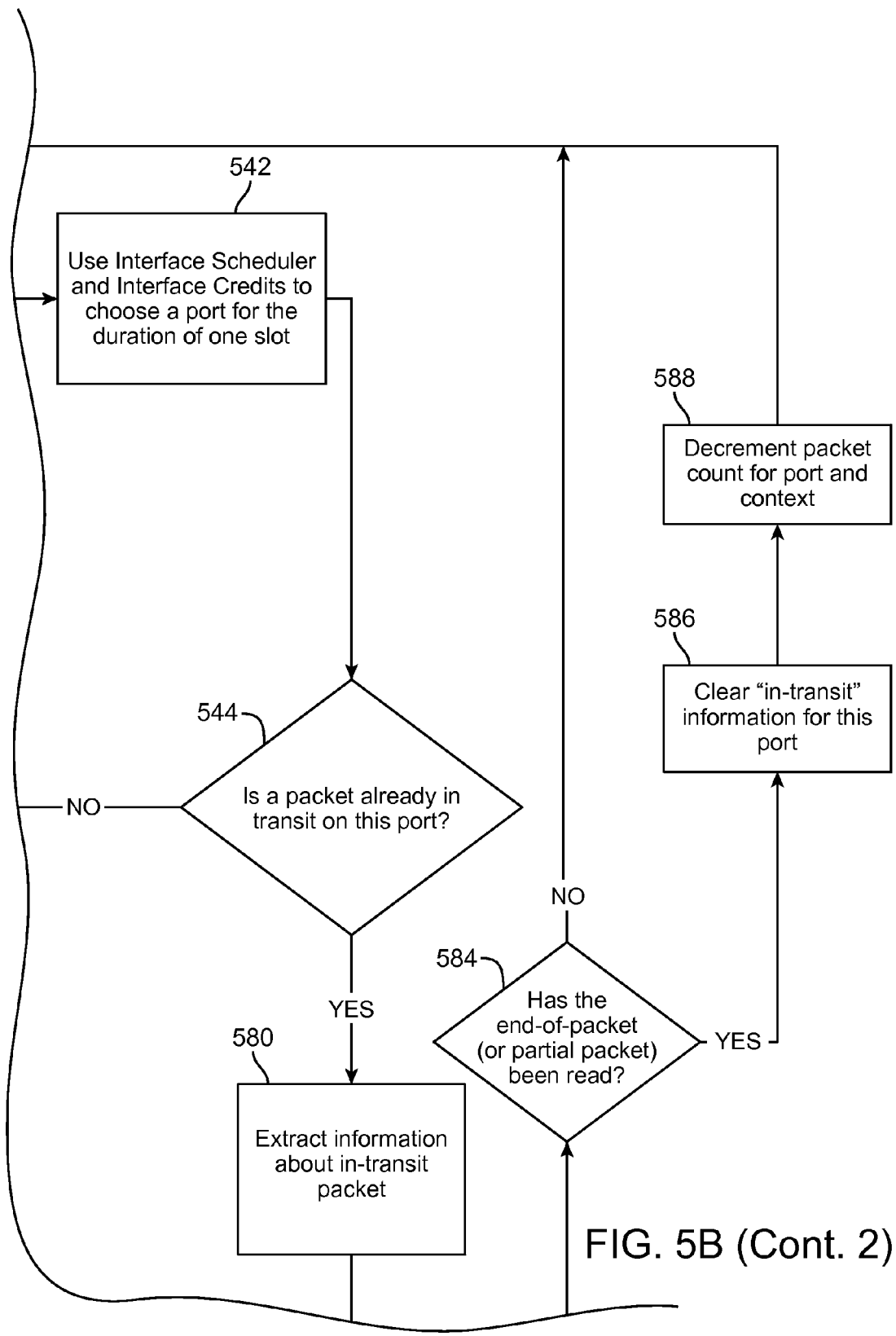
FIG. 5B (Cont. 2)

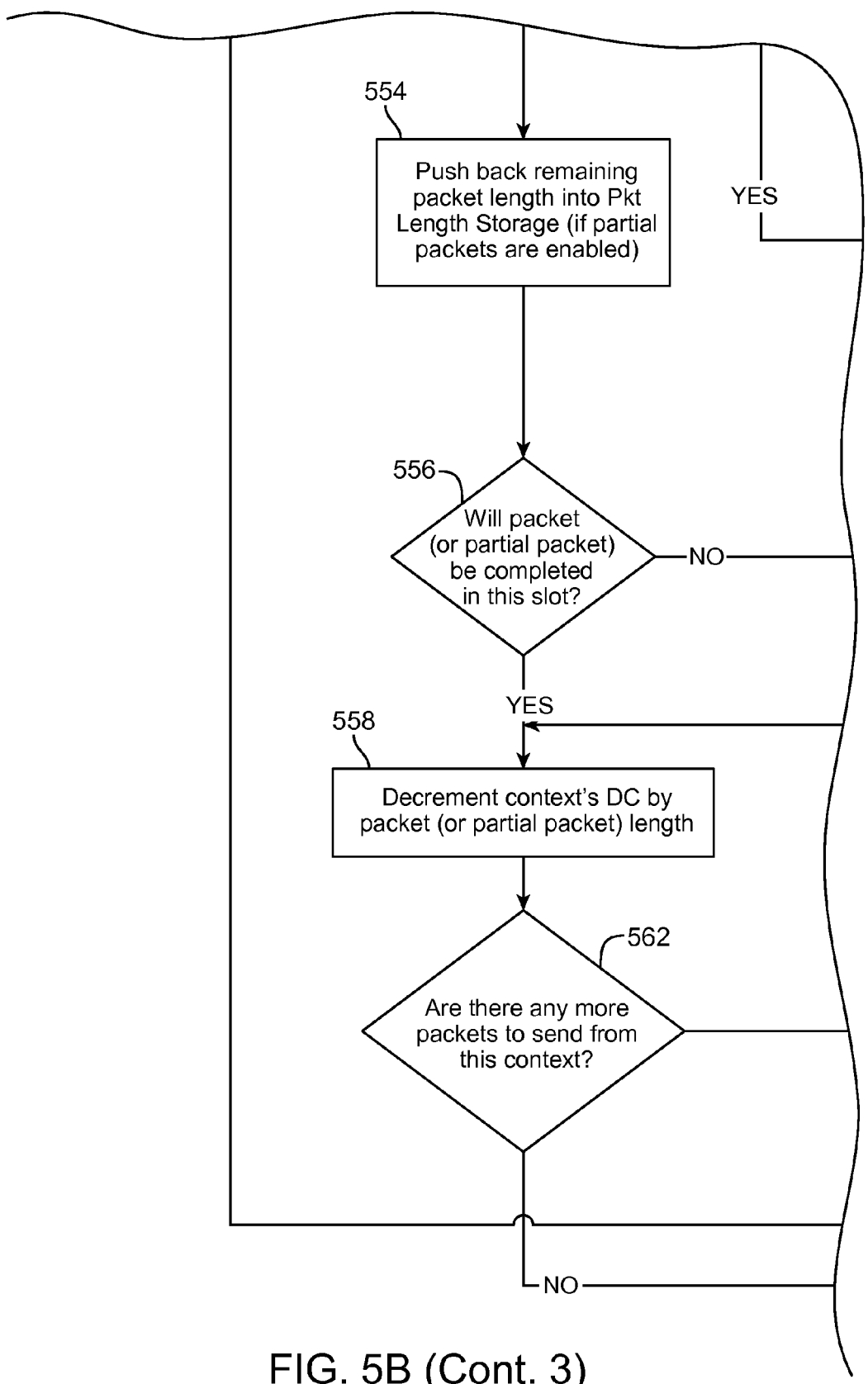
FIG. 5B (Cont. 3)

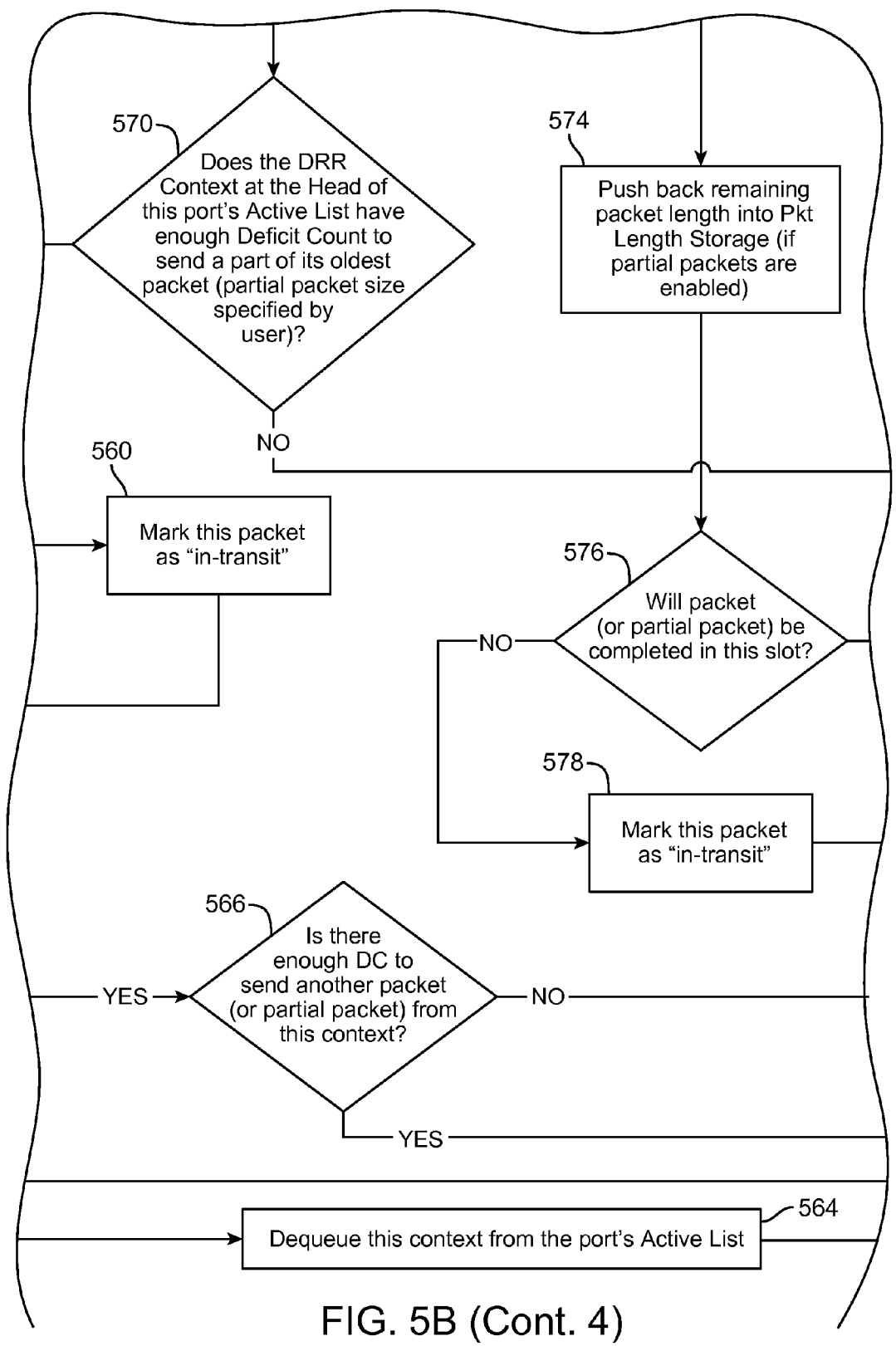
FIG. 5B (Cont. 4)

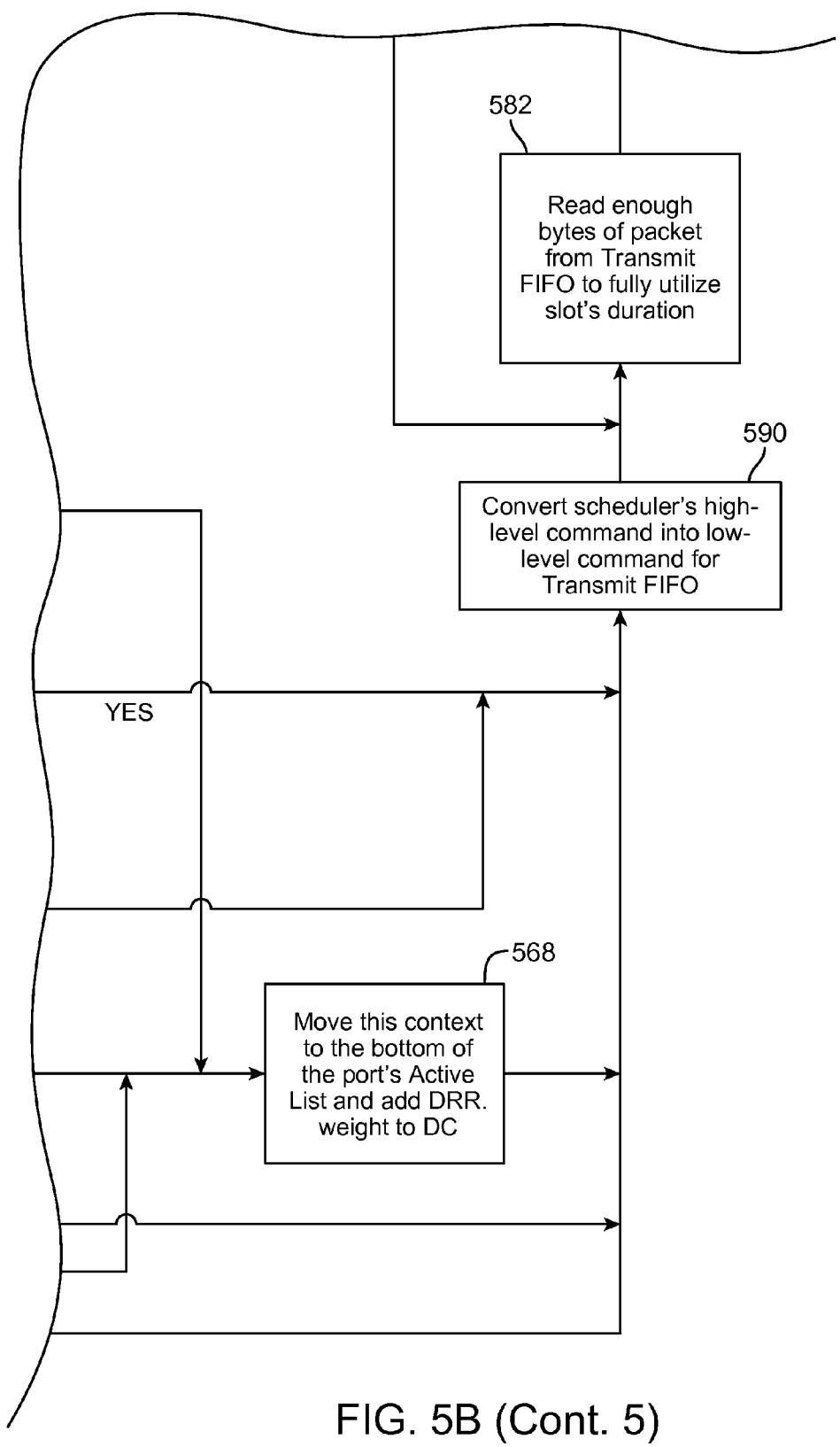
FIG. 5B (Cont. 5)

US 8,943,236 B1

PACKET SCHEDULING USING A PROGRAMMABLE WEIGHTED FAIR QUEUING SCHEDULER THAT EMPLOYS DEFICIT ROUND ROBIN

CROSS-REFERENCE TO RELATED APPLICATIONS

The present application claims the benefit of U.S. Provisional Application 61/499,686, filed on Jun. 21, 2011, which is hereby incorporated by reference in its entirety.

FIELD

The present disclosure relates to packet scheduling. In particular, it relates to packet scheduling using a programmable weighed fair queuing scheduler that employs deficit round robin (DRR).

BACKGROUND

Transmission ports have limited bandwidth resources. Conventional schemes for packet scheduling can often lead to an unfair scheduling of the data packets to these transmission ports. Accordingly, an improved packet scheduling approach for an efficient fair sharing of the transmission port resources is needed.

SUMMARY

Systems, apparatusses, and methods are disclosed for packet scheduling using a programmable weighed fair queuing scheduler that employs deficit round robin (DRR). The disclosed packet scheduler supports concurrent, mutually-independent packet scheduling for a plurality of destination ports (e.g., eighteen (18) destination ports). This packet scheduler features multiple optional strict-priority (SP) flows (e.g., eight (8) SP flows), and hundreds of weighted DRR flows. Similar to the SP flows, the DRR flows are also optional, and a user may choose to have no DRR flows in the device. However, every flow in the device is selected to be either a SP flow or a DRR flow. The term "DRR flow" refers to any flow that participates in the DRR scheduling. The DRR flows share a port's bandwidth according to a weighted fair manner (i.e. Weighted Fair Queuing (WFQ)). Given several DRR flows are mapped to a single destination port (e.g., each destination port can have up to 256 flows), the user can specify the fraction of port bandwidth to be allocated to each DRR flow. The DRR flows share only that bandwidth which remains after all strict-priority flows have sent out their data packets. In some embodiments, respective ports (e.g., each port) can be independently configured to transmit partial data packets, which are referred to as "bursts". In such a case, the packet scheduler schedules a burst from each data packet and "pushes back" the remainder of the data packet into the packet scheduler's queue. In spite of the partial data packet pushback feature, the disclosed packet scheduler has the same fairness characteristics as a conventional DRR scheduler.

For example, a method for data packet scheduling involves mapping a flow of a data packet to one port. The method further involves selecting the flow of the data packet to be a strict priority (SP) flow or a weighted deficit round robin (DRR) flow. In addition, the method involves providing the data packet to the packet scheduler to be transmitted. Also, the method involves selecting a transmission port for the data packet to be transmitted, where the transmission port is the port to which the flow of the data packet is mapped. In addition, if the flow of the data packet is selected to be a SP flow, the method involves transmitting at least a portion of the data packet to the transmission port when the data packet is in front of a SP queue, and no other data packet is already in transit on the transmission port. Additionally, if the flow of the data packet is selected to be a DRR flow, the method involves transmitting at least a portion of the data packet to the transmission port when: the DRR dequeuing module determines the data packet is to be transmitted, no other data packet with a SP flow is mapped to the transmission port, and no other data packet is already in transit on the transmission port.

In one or more embodiments, the method further involves selecting entire data packet transmission or partial data packet transmission for the data packet. If partial data packet transmission is selected, the method involves transmitting a portion of the data packet to the transmission port, and pushing the portion of the data packet that is not transmitted back into packet length storage. However, if entire data packet transmission is selected, the method involves transmitting the entire data packet to the transmission port.

In at least one embodiment, the method also involves writing the length of the data packet to packet length storage. In some embodiments, the packet length storage contains separate first-in-first-out (FIFO) units for each flow. In one or more embodiments, respective ports (e.g., each port) have an active list that contains a list of DRR flows that are mapped to the port and have data packets available for transmission. In at least one embodiment, when more than one DRR flow is mapped to a port, the method further involves selecting fractions of bandwidth of the port to be allocated to each of the DRR flows.

In one or more embodiments, the disclosed data packet scheduler includes packet length storage, an interface scheduler, and a priority scheduler. In at least one embodiment, the length of at least one data packet to be transmitted is written to the packet length storage. In some embodiments, the interface scheduler is connected to the packet length storage, and the interface scheduler selects a port from a plurality of ports for at least one of the data packets to be transmitted. In one or more embodiments, the priority scheduler is connected to the interface scheduler, and the priority scheduler includes a strict priority (SP) scheduler and a weighted deficit round robin scheduler (DRR).

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

Some embodiments of the present disclosure will now be described in detail with respect to the drawings, which are provided as illustrative examples. Notably, the figures and examples below are not meant to limit the scope of the disclosure to a single embodiment, but other embodiments are possible by way of interchange of some or all of described or illustrated embodiments. Whenever convenient, the same reference numbers will be used throughout the drawings to refer to the same or like parts. Where certain elements of the embodiments can be partially or fully implemented using known components, only those portions of known components that are necessary for understanding of the embodiment will be described, and detailed descriptions of other portions of such known components will be omitted so as to not obscure the description. In the present specification, an embodiment showing a singular component should not be considered to be limiting; rather, other embodiments may include a plurality of the same components, and vice versa, unless explicitly stated otherwise. Moreover, applicants do not intend to for any term in the specification or claims to be ascribed an uncommon or special meaning unless explicitly set forth as such. Further, embodiments encompass present and future known equivalents to the components referred to by way of illustration.

In some embodiments, a packet scheduler employs a scheme that uses a deficit round robin (DRR) approximation with weighted fair queuing (WFQ). The packet scheduler is able to achieve complete fairness of transmission for a plurality of flows (e.g., several hundred source flows, for example 524 flows). A source flow is mapped to one destination port. Additionally, the packet scheduler allows the user to optionally map multiple strict-priority flows to each of the destination ports. The packet scheduler keeps these strict-priority flows separate from the group of flows for which fairness is enforced. Each destination port can be configured to transmit only portions of the data packets. The remainder of the data packets get "pushed back" into the scheduler. The packet scheduler works in two mutually orthogonal dimensions: (1.) it selects destination ports based on a round-robin scheme, or using another method, such as guaranteed rate port scheduling (GRPS), and (2.) it implements optional strict-priority scheduling, and DRR scheduling.

Figure 1:
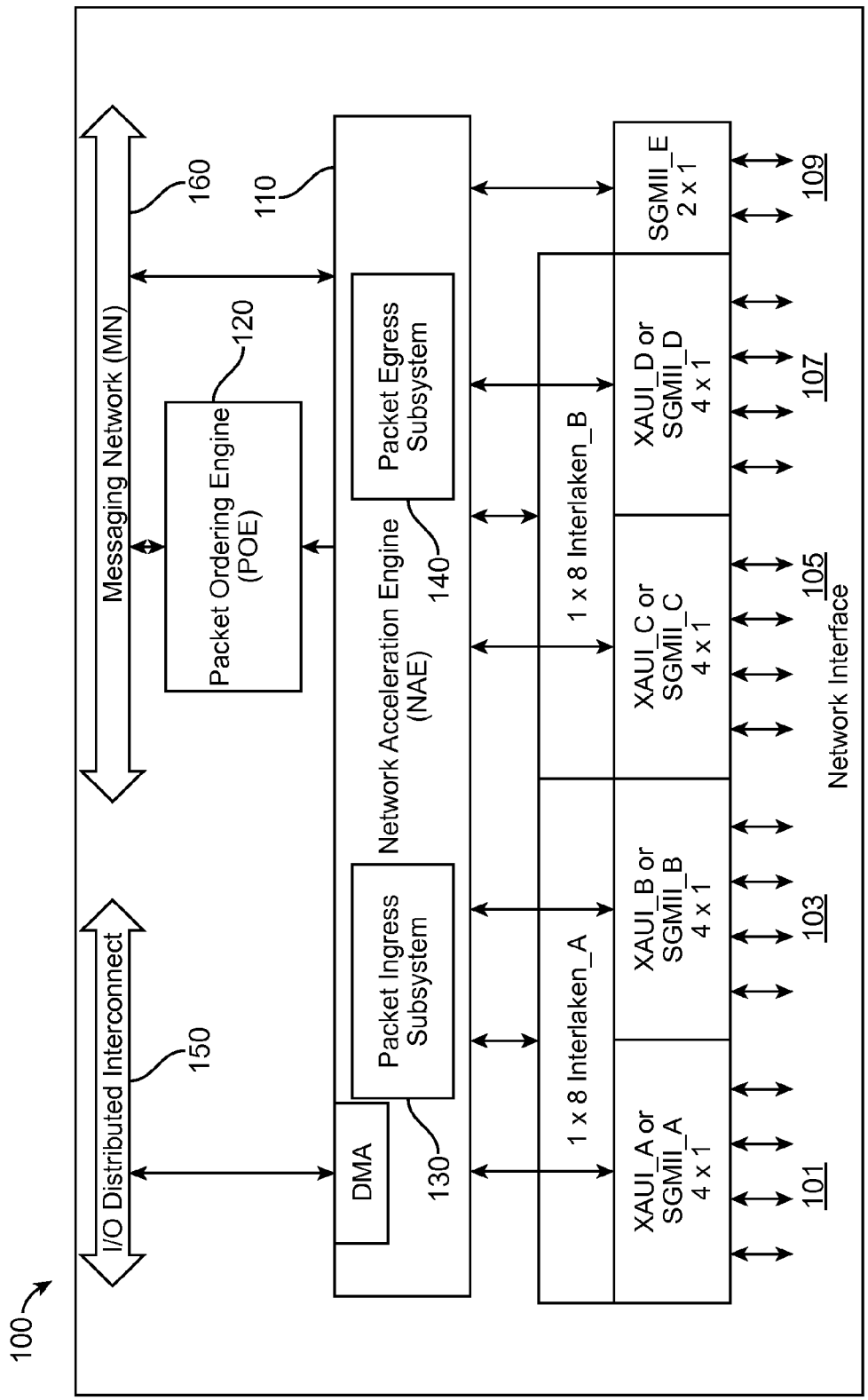
FIG. 1 is a diagram illustrating an exemplary system that employs the disclosed packet scheduler, in accordance with at least one embodiment of the present disclosure.

FIG. 1 is a diagram illustrating an exemplary system 100 that employs the disclosed packet scheduler, in accordance with at least one embodiment of the present disclosure. The system 100 is part of a processor, and the I/O distributed interconnect 150 and the messaging network (MN) 160 are connected to memory (refer to item 170 in FIG. 2) and a plurality of processors (refer to item 180 in FIG. 2). In particular, this figure shows a network acceleration engine (NAE) 110 along with other related blocks. In this figure, all networking interfaces 101, 103, 105, 107, 109 are shown to be connected to the centralized NAE 110 for data packet parsing and classification. For this particular exemplary system 100, the NAE 110 is capable of handling an aggregate of 40 Gigabits per second (Gbps) of ingress traffic and 40 Gbps of egress traffic for data packets with sizes of 64 bytes or more.

A packet ordering engine (POE) 120 is responsible for ensuring that data packet fragments belonging to a specific flow are transmitted by the NAE Packet Egress Subsystem (NAE Tx) 140 in the same order in which they were received by the NAE Packet Ingress Subsystem (NAE Rx) 130. The main functions of the NAE Packet Ingress Subsystem 130 are to perform parsing and classification of incoming data packets before passing control to the POE 120. The NAE Packet Ingress Subsystem 130 performs these functions using a dedicated hardware parser and up to sixteen (16) programmable micro-core processors. Other features of the NAE Packet Ingress Subsystem 130 include, but are not limited to, hardware-assisted internet protocol/transmission control protocol/user datagram protocol (IP/TCP/UDP) checksum validation, IEEE 1588v2 protocol timestamp support, pre-padding bytes (e.g., 64 bytes) to the received data packet for storing a classification key (e.g., 40-bytes in size) and timestamp, and class-based flow control to support selective lossless network connectivity.

In addition, the system 100 employs free descriptor queues that are divided into a number of descriptor pools (e.g., twenty (20) pools). Descriptors are message units of specially formatted words that are, for example, 64-bits in length. For the NAE 110, each descriptor points to a pre-allocated data buffer in memory (e.g., the L3 cache and DRAM 170 of FIG. 2) where packet data will be stored. Software uses free-in messages to initialize the descriptors in the pools. The micro-core processors in the NAE Packet Ingress Subsystem 130 determine which descriptor pool to draw descriptors from for each data packet, thereby determining where each data packet will be written in memory.

The NAE Packet Egress Subsystem 140, as its name implies, is responsible for transmitting the data packets via interfaces 101-109. Other functions of the NAE Packet Egress Subsystem 140 include, but are not limited to, IP/TCP/UDP checksum generation and insertion, data packet assembly, TCP segmentation offloading (TSO) by use of an incorporated TSO engine, priority/deficit round robin-based packet scheduling for egress to the network interface, and time-stamping the transmitted data packet for IEEE 1588v2 protocol support.

Figure 2:
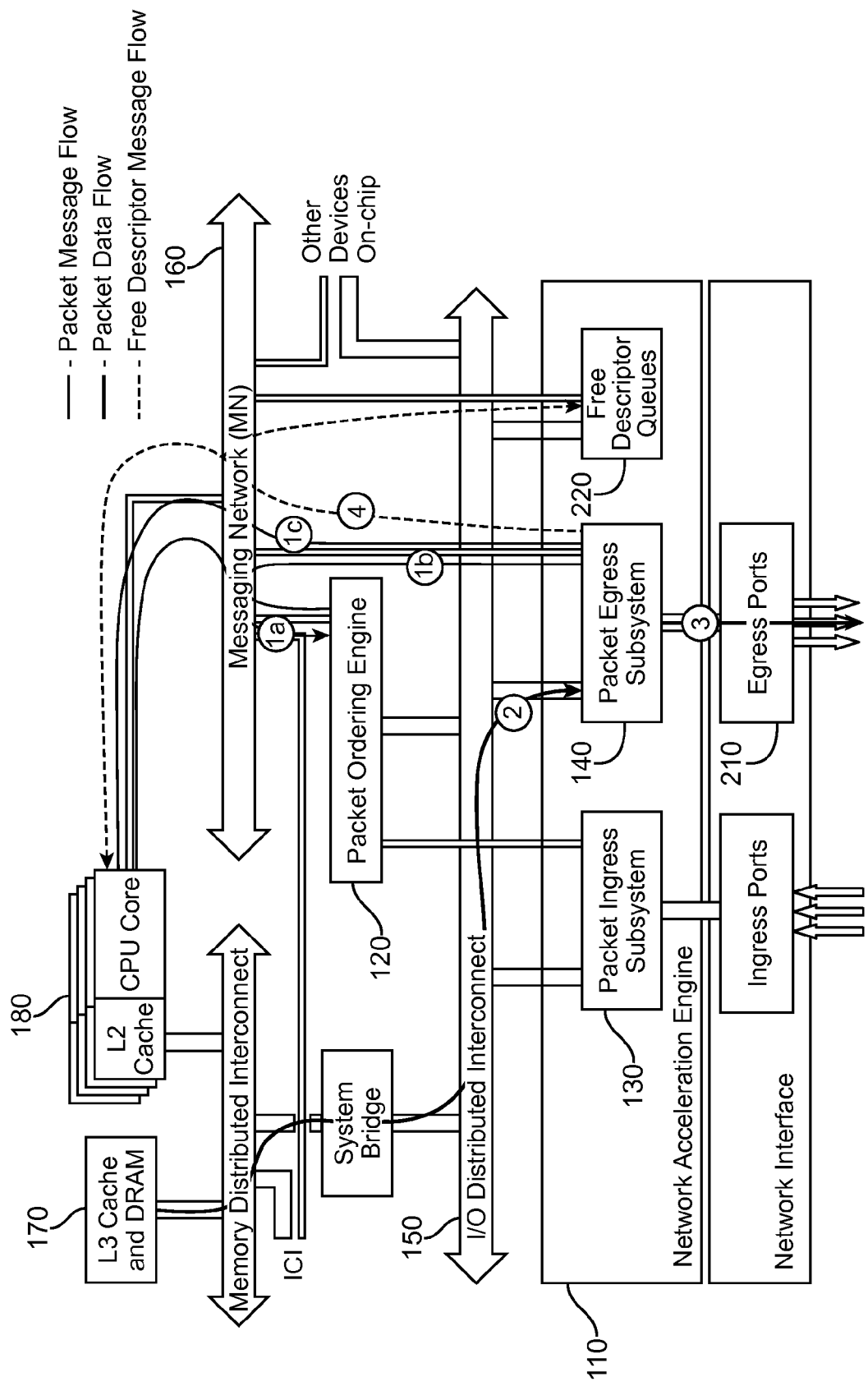
FIG. 2 is a diagram illustrating the egress flow of a data packet through the exemplary system of FIG. 1, in accordance with at least one embodiment of the present disclosure.

FIG. 2 is a diagram illustrating the egress flow of a data packet through the exemplary system 100 of FIG. 1, in accordance with at least one embodiment of the present disclosure. During normal processing, when packet descriptors are accompanied by POE descriptors, a processor thread, either real or virtual, in a central processing unit (CPU) core sends the packet descriptors back to the POE 120 (denoted by message flow 1a in FIG. 2). If the data packet is for transmission, the POE 120 will forward the packet descriptors to the NAE Packet Egress Subsystem 140 (denoted by message flow 1b in FIG. 2) in the same order they were received in the NAE Packet Ingress Subsystem 130. If no POE descriptor is associated with the packet descriptors, the processor thread sends the packet descriptors directly to the NAE 110 (denoted by message flow 1c in FIG. 2).

Then, the NAE 110 reads the data from packet buffers in a L3 cache/DRAM that is pointed to by the packet descriptors (denoted by message flow 2 in FIG. 2), and optionally calculates a IP/TCP/UDP checksum and/or a stream control transmission protocol (SCTP) checksum for the data. In addition, the NAE Packet Egress Subsystem 140 performs TCP segmentation offload (TSO) in hardware. The NAE Packet Egress Subsystem 140 transmits the packet data to the Network Interface Egress Ports 210 (e.g., interfaces 101-109, FIG. 1) for final transmission (denoted by message flow 3 in FIG. 2). Optionally, the data packet is time stamped for IEEE 1588v2 protocol support.

The Packet Egress Subsystem 140 frees up packet descriptors that are associated with data packets that have been transmitted to the free descriptor queues 220 (denoted by message flow 4 in FIG. 2). In addition, optionally, a notice regarding the free descriptors is sent to the processor thread. If the data packet transmission was initiated by the processor thread, packet descriptors can be freed up to the processor thread to free up the allocated memory.

Figure 3:
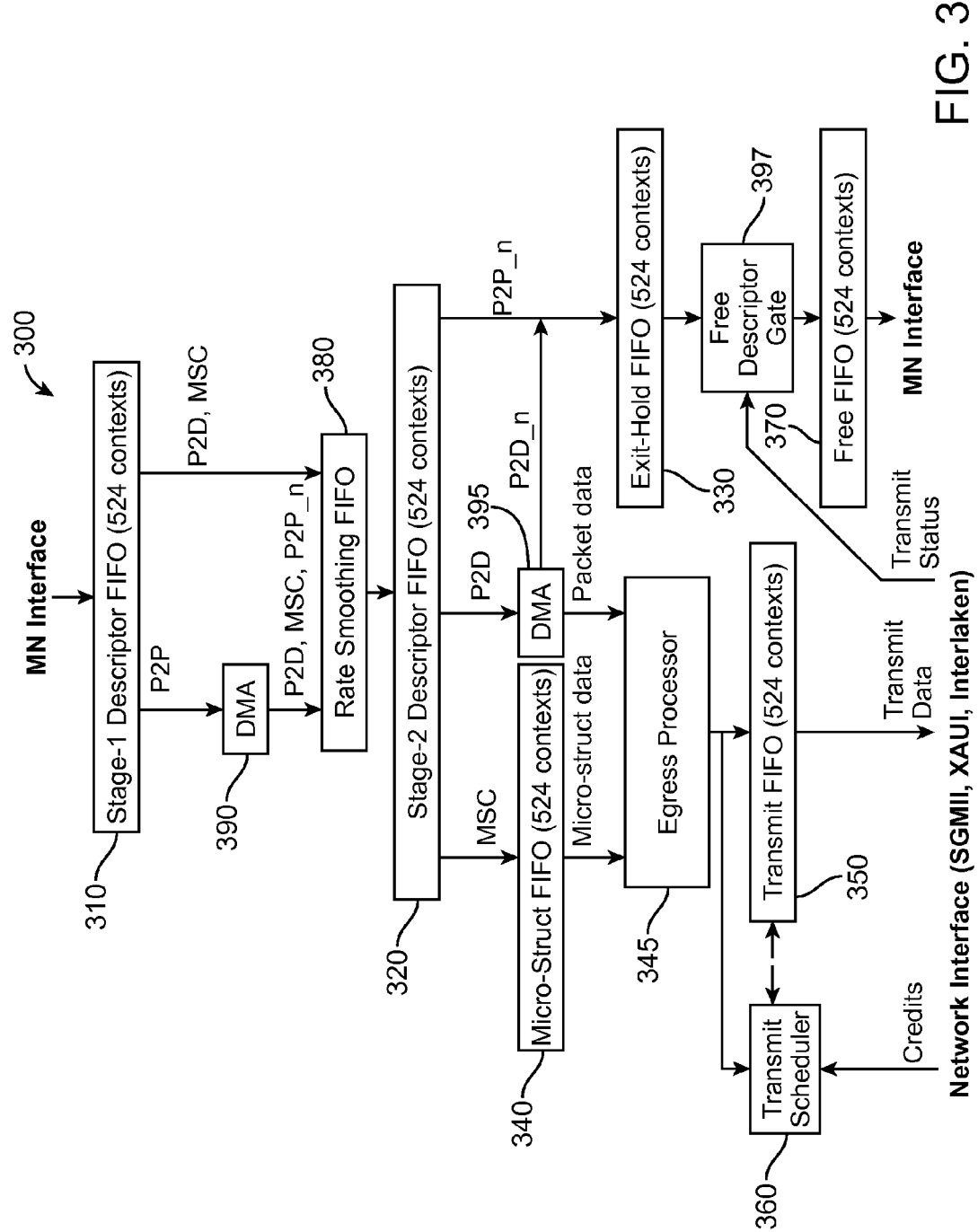
FIG. 3 is a functional block diagram of the egress path of the exemplary system of FIG. 1, in accordance with at least one embodiment of the present disclosure.

FIG. 3 is a functional block diagram 300 of the egress path of the exemplary system 100 of FIG. 1, in accordance with at least one embodiment of the present disclosure. The egress side of the NAE 110 receives packet descriptors that contain information about the data packets, processes the packet descriptors, and then reads the transmit data packets from memory according to the packet descriptors. Transmit (Tx) packet descriptors are broadly classified into three general types, which are (1.) a pointer-to-data descriptor (P2D), (2.) a pointer-to-list-of-pointers descriptor (P2P), and a micro struct control descriptor (MSC). A P2D descriptor points directly to packet data in memory, and a P2P descriptor contains a pointer to a list of P2D descriptors. An MSC descriptor is a command structure that instructs the Egress Processor 345 what operation to perform on the data packet that is associated with the next P2D descriptor. During normal operation, the POE 120 sends Tx packet descriptors to the NAE 110 using the messaging network (MN) (refer to 230 in FIG. 2), although it should be noted that a processor thread could also generate a Tx data packet. These Tx packet descriptors are stored in a message queue area, which allows for up to a specific number of contexts (e.g., 524 contexts).

The egress path of FIG. 3 contains a number of first-in-first-out units (FIFOs) 310, 320, 330, 340, 350, 370, 380 with associated logic; direct memory access (DMA) 390, 395 lookup logic; and an Egress Processor 345. The egress path receives the Tx packet descriptors from a processor thread via the messaging network. Then, the descriptors are fed into the Stage-1 Descriptor FIFO 310, which acknowledges the message by returning a message credit to the messaging network. Logic in the output stage of the Stage-1 Descriptor FIFO 310 directs P2P descriptors to a DMA engine 390. The DMA engine 390 in turn retrieves from memory, via the I/O distributed interconnect, the list of P2D descriptors and MSC descriptors that are pointed to by the P2P descriptor, and inserts these descriptors in the descriptor stream at the position of the P2P descriptor.

The Stage-2 Descriptor FIFO 320 directs the P2D descriptors to the DMA 395, which retrieves the associated packet data from memory and sends the packet data to the Egress Processor 345. The P2D and P2P descriptors are sent to the Exit Hold FIFO 330 where they will remain until the packet data has been transmitted out by the network interface. The output logic of the Stage-2 Descriptor FIFO 320 forwards MSC descriptors to the Micro-Struct FIFO 340. The Micro-Struct FIFO 340 holds the micro-struct, which contains up to two MSC descriptors, until the packet data associated with the packet descriptor following the MSC descriptor(s) is fed into the Egress Processor 345. The MSC descriptor(s) controls the operation to be performed on the data packet.

The processed data packet is then fed into a context-specific Transmit FIFO 350. The scheduling of the data packets to each transmit network interface is performed by, for example, a 9-level strict priority Transmit Scheduler 360 (i.e. the disclosed packet scheduler), which is comprised of, for example, eight (8) strict-priority levels and one (1) deficit round-robin (DRR) level. Alternatively, the transmit scheduler 360 includes more or fewer strict-priority levels and/or DRR levels. The Transmit Scheduler 360 also includes the guaranteed rate port scheduler (GRPS). The GRPS obtains the data packets and schedules their transmission to the network interface ports (also referred to as transmit ports or destination ports) through the Transmit FIFO 350.

After a data packet has been transmitted from the network interface, the network interface returns the transmit status, including an IEEE 1588v2 protocol time stamp indicating when the packet was transmitted if requested by the software. Upon receiving the transmit status signal, the associated P2D and P2P descriptors are released from the Exit Hold FIFO 330, and returned, via the Free Descriptor Gate 397 and the Free FIFO 370, to the Free Descriptor Queue 220 (refer to FIG. 2).

The NAE Packet Egress Subsystem (NAE Tx) (refer to 140 on FIG. 1) contains a hardware-implemented TCP segmentation offload (TSO) engine. The TSO engine can break large transmission control protocol/internet protocol (TCP/IP) data packets, which for example are up to 65,535 bytes in size, into TCP segments that have payloads equal to or less than the maximum segment size (MSS). The MSS is the largest amount of payload data that can be encapsulated by a header of a TCP segment.

Figure 4:
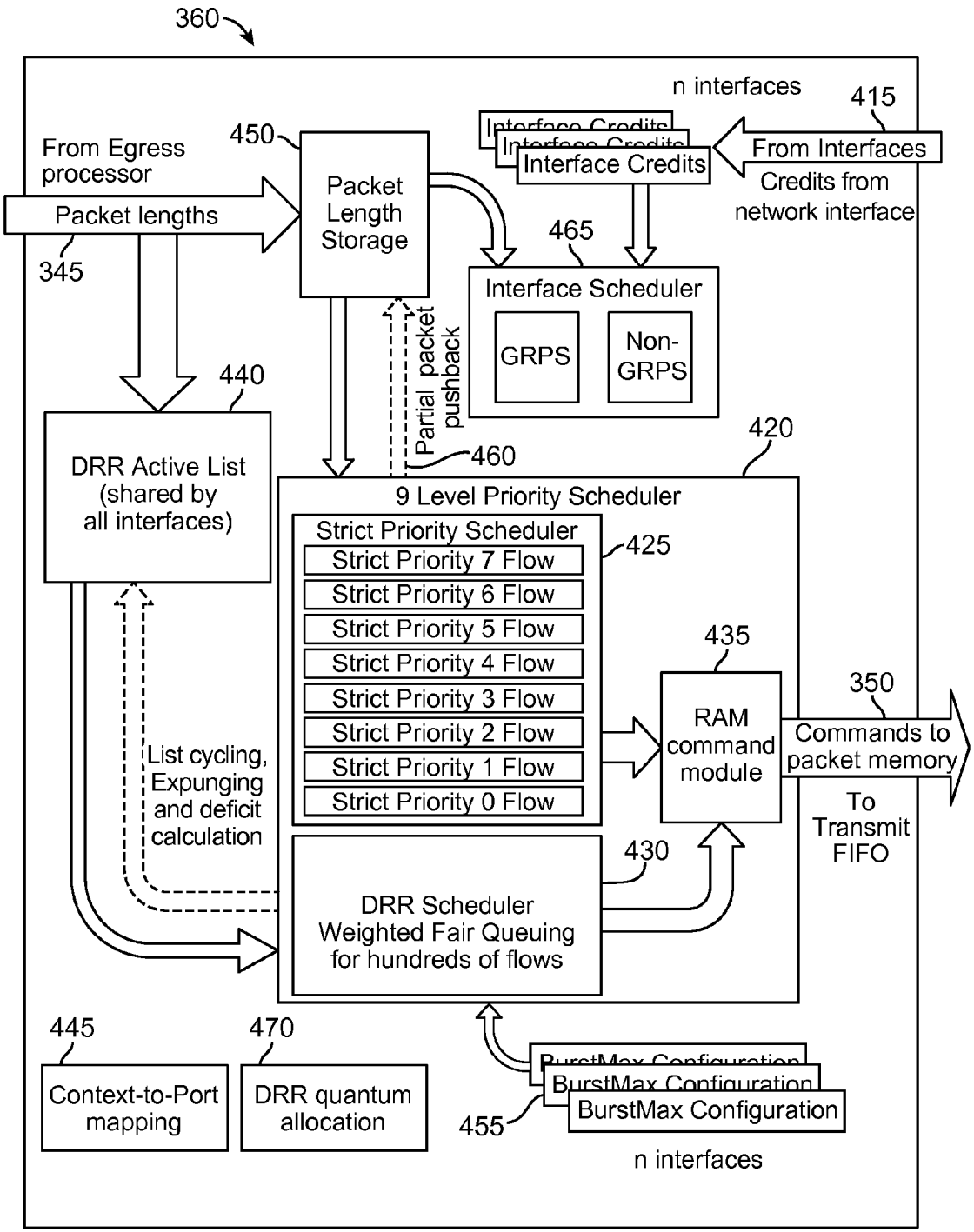
FIG. 4 is a block diagram illustrating the disclosed packet scheduler, in accordance with at least one embodiment of the present disclosure.

FIG. 4 is a block diagram illustrating the disclosed packet scheduler 360, in accordance with at least one embodiment of the present disclosure. In this figure, the data packets to be transmitted are sourced from the egress processor 345, and credits 415 come from the network interface. The disclosed packet scheduler 360 is shown to include a 9-level priority scheduler 420. The 9-level priority scheduler 420 includes a strict priority scheduler 425, a DRR scheduler 430 that uses weighted fair queuing, and a RAM command module 435.

Whenever a new packet arrives from the egress processor 345, its packet length is written to packet length storage 450, which contains separate FIFOs for each of the contexts (e.g., there are 524 contexts). Additionally, if a context is a DRR context and its FIFO was empty when the packet arrived, the context is queued into the port's active list 440 as per the DRR algorithm's enqueuing module. There is one active list per destination port. A port's active list is an ordered list of all DRR contexts mapped to that port that have packets available for transmission.

As a first step in the departure process, the interface scheduler 465 selects a port from the list containing multiple possible non-empty ports (e.g., 18 possible non-empty ports). Once the port has been selected, control is passed on to the 9-level scheduler 420, which is shown to be comprised of 8 strict-priority (SP) levels 425 (with level 0 as the highest priority level), and one default deficit round-robin (DRR) level 430. In some embodiments, a maximum of one context can be assigned to each of the eight (8) non-default strict priority levels. A large number of DRR contexts, which in some embodiments can be hundreds of such contexts (e.g., up to 256 DRR contexts), can be assigned to the same transmit network interface port. Scheduling is defined for each context by a content-to-port mapping 445. Additionally, for SP contexts it is defined by an SP number, and for DRR contexts it is defined by a DRR quantum allocation 470.

Concurrent departures on multiple ports are handled by dividing the transmit bus' cycles into "slots" of very short duration, and by time-division-multiplexing the packets destined for various ports onto this bus. This implies that the interface scheduler 465 as well as the 9-level scheduler 420 compute a new decision in every slot. Transmissions for strict-priority contexts happen whenever packets are available in the SP queues, and no packet or portion thereof is already in transit on the port. Transmissions for DRR contexts happen as per the DRR algorithm's dequeuing module, provided no SP flow mapped to the port has any packet or portion thereof to send, and no packet or portion thereof is already in transit on the port.

Partial packet transmission can be enabled in the BurstMax configuration register 455. If partial packet transmission is enabled, both SP and DRR flows can transmit partial packets by scheduling a portion of the packet, and pushing the remainder back into packet length storage 450. Commands issued by the SP and DRR schedulers are in terms of packets (or bursts, if enabled). The RAM Command Module 435 converts them into low-level commands for the packet transmit FIFO 350.

Figure 5A:
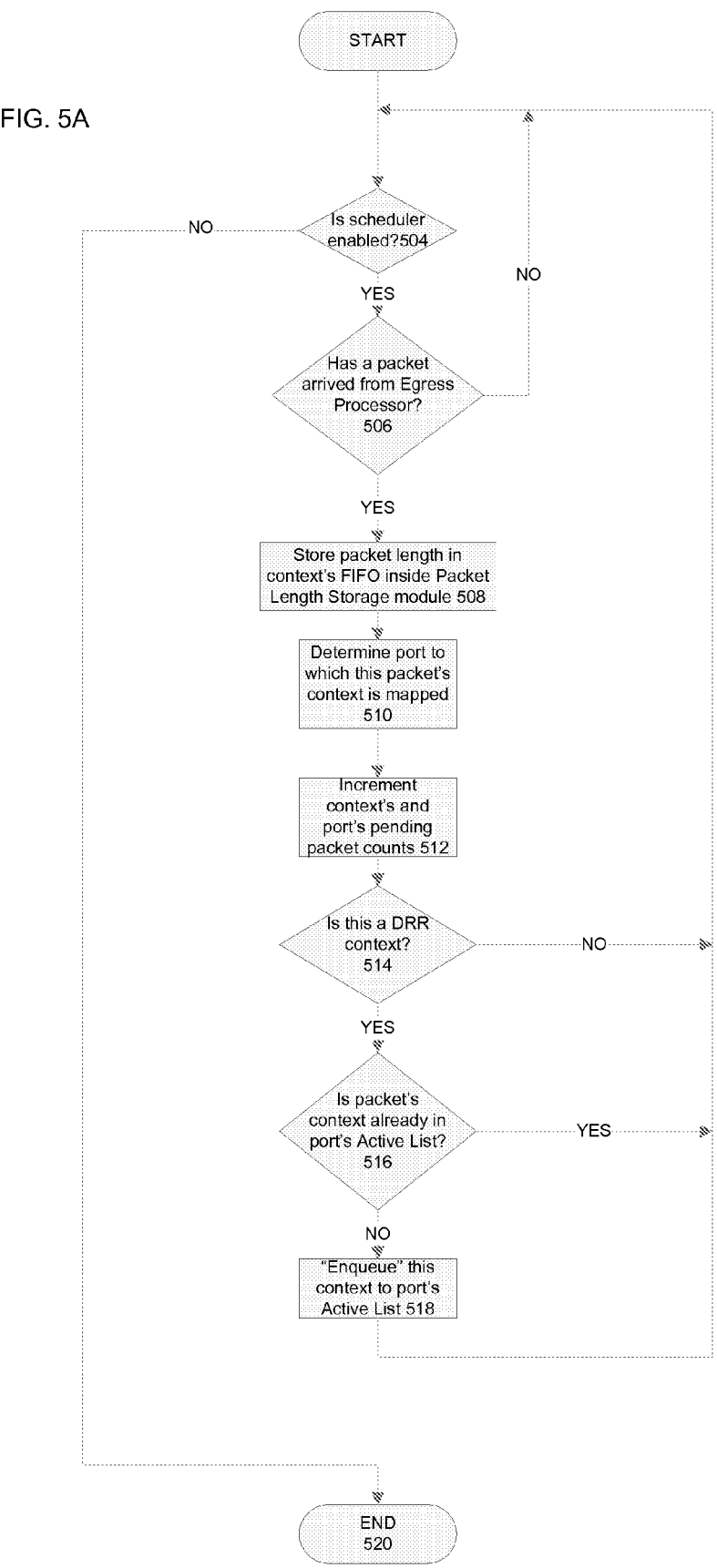
FIG. 5A is a flow chart for an approach to implement scheduler enqueuing, in accordance with at least one embodiment of the present disclosure.
Figure 5B:
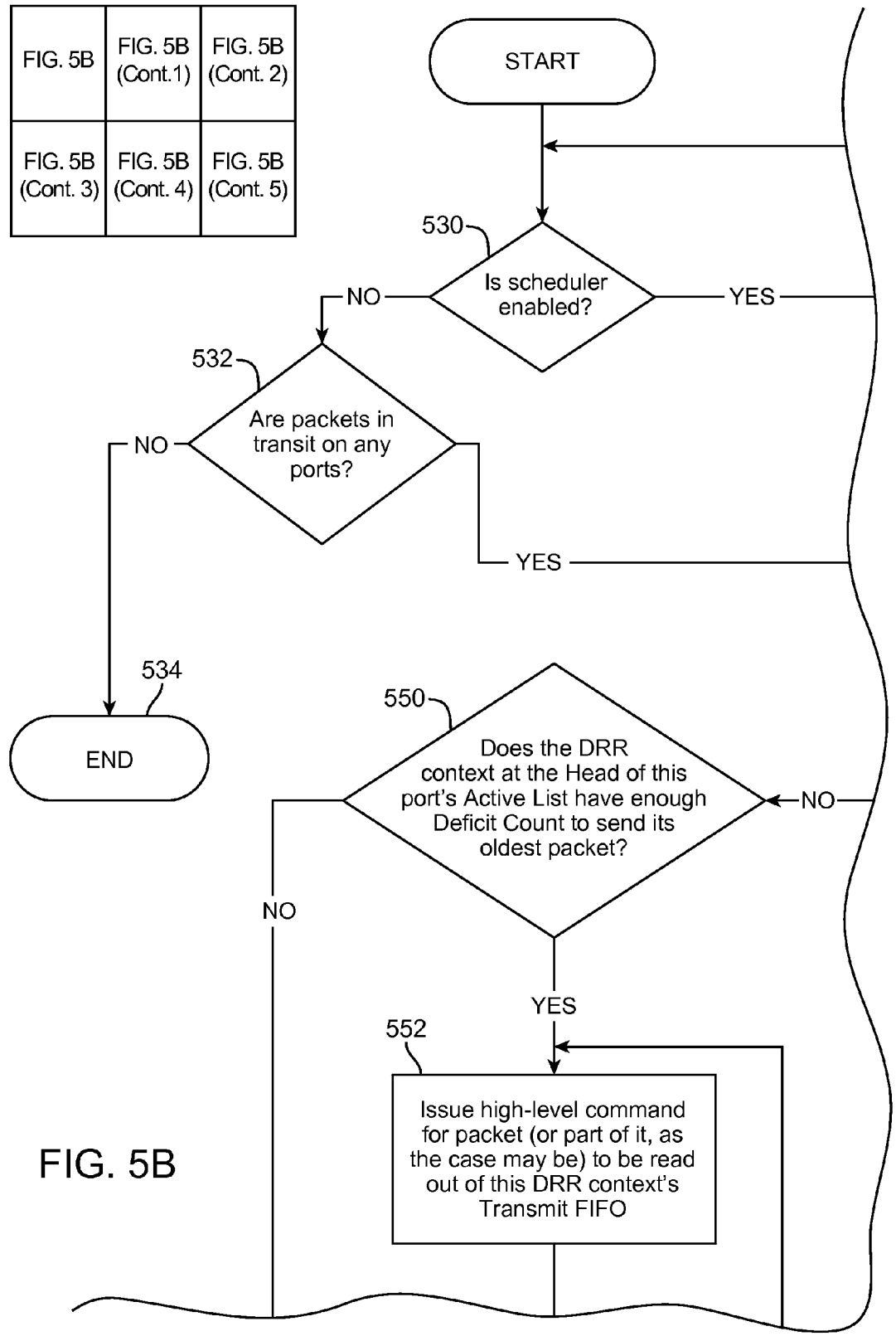
FIG. 5B is a flow chart of an approach to implement scheduler dequeuing, in accordance with at least one embodiment of the present disclosure.

FIGS. 5A and 5B are flow charts of the operation of the disclosed packet scheduler of FIG. 4, in accordance with at least one embodiment of the present disclosure. FIG. 5A illustrates an approach for implementing scheduler enqueuing and FIG. 5B illustrates an approach for implementing schedule dequeuing.

For the enqueue approach of FIG. 5A, a check is made at 504 whether the scheduler has been enabled. If not, then the procedure ends at 520. If the scheduler has been enabled, then another determination is made at 506 whether a packet has arrived from the egress processor. If not, then the procedure loops back to 504. If the determination at 506 is that a packet has arrived from the egress processor, then at 508, the packet length is stored. In some embodiments, the packet length is stored in the context's FIFO inside the Packet Length Storage module (shown as 450 in FIG. 4).

At 510, identification is made of the port to which the packet's context is mapped. Thereafter, at 512, the context's and port's pending packet count is incremented. A determination is made at 514 if the current context is a DRR context. If not, then the procedure loops back to 504. In some cases, even if the current context is not a DRR context it may still be a SP context. In this situation, the procedure can nevertheless directly loop back to 504 from 514 since the processing performed in 508, 510, and 512 takes care of the actions needed to handle a SP context. If the current context is a DRR content, then at 516, a check is made whether the packet is already in the port's Active List. If so, then the procedure loops back to 504. If not, then at 508, the context is enqueued to the port's Active List. The procedure then returns back to 504.

For the dequeue approach of FIG. 5B, a check is made at 530 whether the scheduler has been enabled. If the scheduler is determined to be enabled, then another determination is made at 536 whether there are any ports that have a pending packet count greater than zero. If not, then the procedure loops back to 530. If the determination at 536 is that there are ports which have a pending packet count greater than zero, then the procedure goes to 538 to check whether this is a beginning of a periodic slot. If not, then at 540, a wait is performed for the beginning of a slot. The device generates periodic slots automatically and in an autonomous manner.

From earlier in the flow, if the check at 530 was that the scheduler is not enabled, then another check is made at 532 whether there are any packets currently in transit on any ports. If there are no packets in transit, then the procedure ends at 534. If there are packets currently in transit, then at 533, transmissions are disabled on all ports on which a packet (or partial packets) is not already in transit. This allows the device to gracefully shut down, without truncating packets prematurely, in the event it is disabled by software. This path of the flow also proceeds at this point to 538 to check whether this is a beginning of a periodic slot.

When there is a determination at 538 of being at the beginning of a periodic slot, then the procedure moves to 542 to use the interface scheduler and interface credits to choose a port for the duration of one slot. A determination is made at 544 whether there is already a packet in transit on the port. If so, then at 580, information is extracted about the in-transit packet. At 582, enough of the packet is read in from the transit FIFO to utilize the slot's duration. A determination is made at 584 whether the end-of-packet (or end of the partial packet) has been read. If not, then the procedure loops back to 530. If the end-of-packet (or end of the partial packet) has been read, then at 586, the "in-transit" information is cleared for the port. At 588, the packet count is decremented for the port and the context. The procedure then lops back to 530.

If at 544 there was a determination that there is not already a packet in transit on the port, then the procedure moves to 546 to check whether there is any SP context mapped to the port that has a packet to send. This check can be made in order of priority. If there are any SP contexts that have packets to send, then at 572, a high-level command is issued for the packet (or part of it as necessary) to be read out of the SP context's transmit FIFO. At 574, the remaining packet length is pushed back into the packet length storage, e.g., if partial packets are enabled. A check is made at 576 whether the packet (or partial packet) will be completed in the slot. If so, then at 590, the scheduler's high-level command is converted into a low-level command for the transmit FIFO. The procedure then proceeds to 582 and is handled as described above. If at 576 the determination was that the packet (or partial packet) will not be completed in the slot, then at 578 the packet is marked as being "in-transit". The procedure then proceeds to 590 and is handled as discussed above.

At 546, the "no" branch is taken if there are no pending packets in any of the SP contexts mapped to the port. If that is the case, then at 548, another check is made whether transmissions of partial packets are enabled. If so, then another check is made at 570 whether the DRR context at the head of the port's active list has enough deficit count to send a part of its oldest packet. This check can be made based on partial packet size, e.g., as specified by a user. If there is insufficient deficit count, then the procedure goes to 568 to move the context to the bottom of the port's active list and to add the DRR weight to the DC. The procedure then proceeds to 590 and is handled as described above.

If the determination at 570 is that the DRR context at the head of the port's active list has enough deficit count to send a part of its oldest packet, then at 552, a high level command for a part of the packet is issued to be read out of the DRR context's transmit FIFO. At 554, the remaining packet length is pushed back into the packet length storage (e.g., if partial packets are enabled). A check is made at 556 whether the partial packet will be completed in the slot. If not, then at 560, the partial packet is marked as being "in-transit". After 560, or if the determination was made at 556 that the packet (or partial packet) will be completed in the slot, then at 558, the context's DC is decremented by the packet (or partial packet) length.

At 562, a determination is made whether there are any more packets to send from the context. If so, then at 566 another check is made whether there is enough DC to send another packet (or partial packet) from the context. If so, then the procedure proceeds to 590, and is handled as described above. If not, then the procedure moves to 568 to move the context to the bottom of the port's active list and to add the DRR weight to the DC. The procedure then proceeds to 590 and is handled as described above. If the determination at 562 was that there are no more packets to send from the context, then at 564 the context is dequeued from the active list. The procedure then proceeds to 590 and is handled as described above.

If at 548, it was determined that the transmissions of partial packets were not enabled, then a determination is made at 550 whether the DRR context at the head of the port's active list has enough deficit count to send its oldest packet. If so, then the procedure proceeds to 552 and is handled as discussed above, with the difference that the entire packet length is used wherever partial packet length was used in the above discussion. If not, then the procedure proceeds to 590 and is handled as described above.

Figure 6:
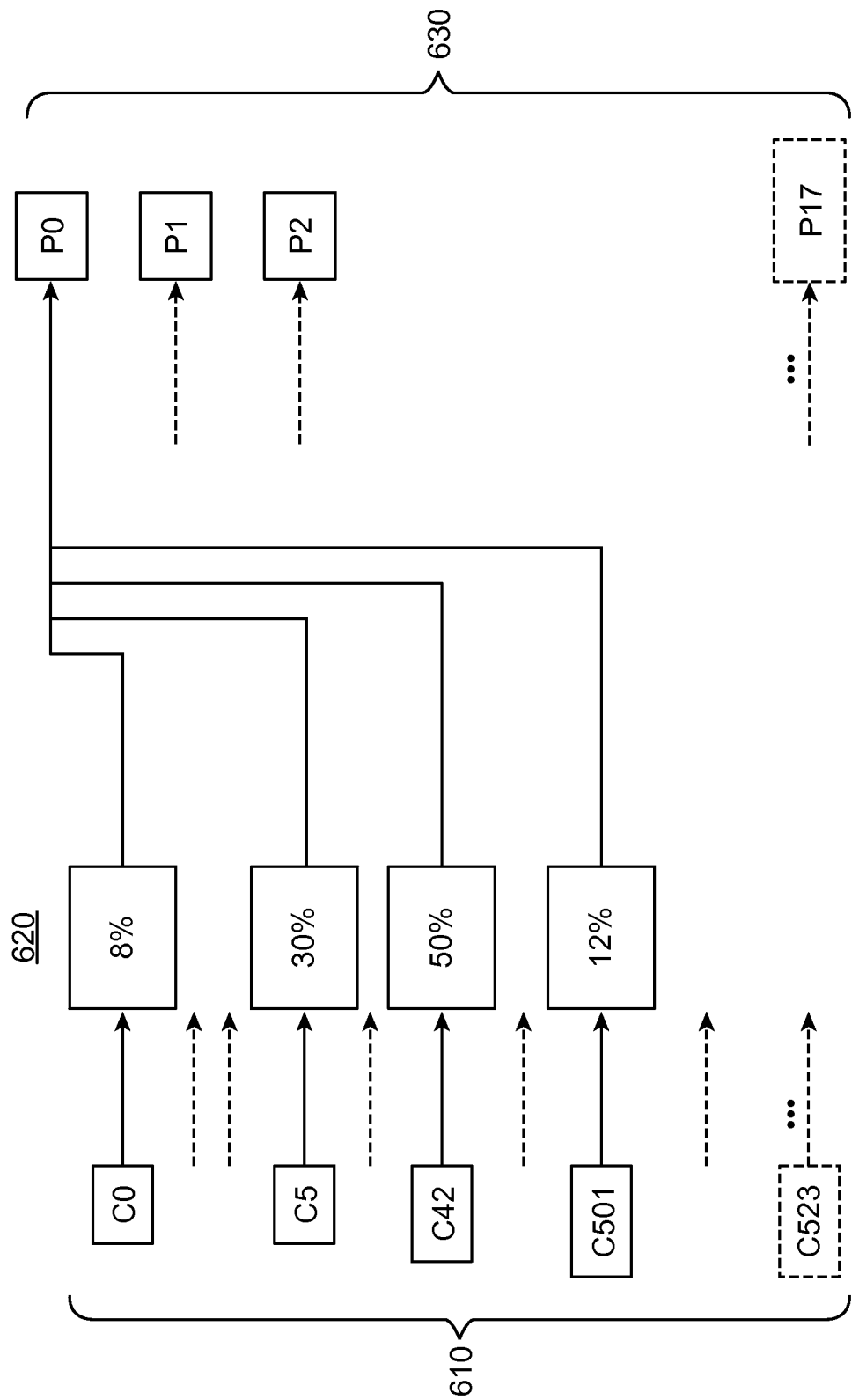
FIG. 6 shows an overview of the weighted deficit round robin (DRR) process employed by the disclosed packet scheduler of FIG. 4, in accordance with at least one embodiment of the present disclosure.

FIG. 6 shows an overview of the weighted deficit round robin (DRR) process employed by the disclosed packet scheduler of FIG. 4, in accordance with at least one embodiment of the present disclosure. In particular, this figure shows an example where 524 context input FIFO queues 610 are vying for 18 output ports 630. The example shows four (4) of the input queues (C0, C5, C42, and C501) connected to output port P0. Hundreds of queues (e.g., 256 queues) can be connected to a single output port. The bandwidth of port P0 is unequally divided between the input queues as shown by the percentages, or weights, in boxes 620. This design allows for arbitrary division of a port bandwidth between input queues.

In deficit round robin (DRR), the FIFO queues are sequentially queried, and if the deficit counter associated with a queue is larger than the packet at the head of the queue (HoQ), the HoQ packet is served (i.e. sent), and the queue's deficit counter is reduced by the size of the HoQ packet served. If not, the queue's deficit counter is incremented.

Figure 7:
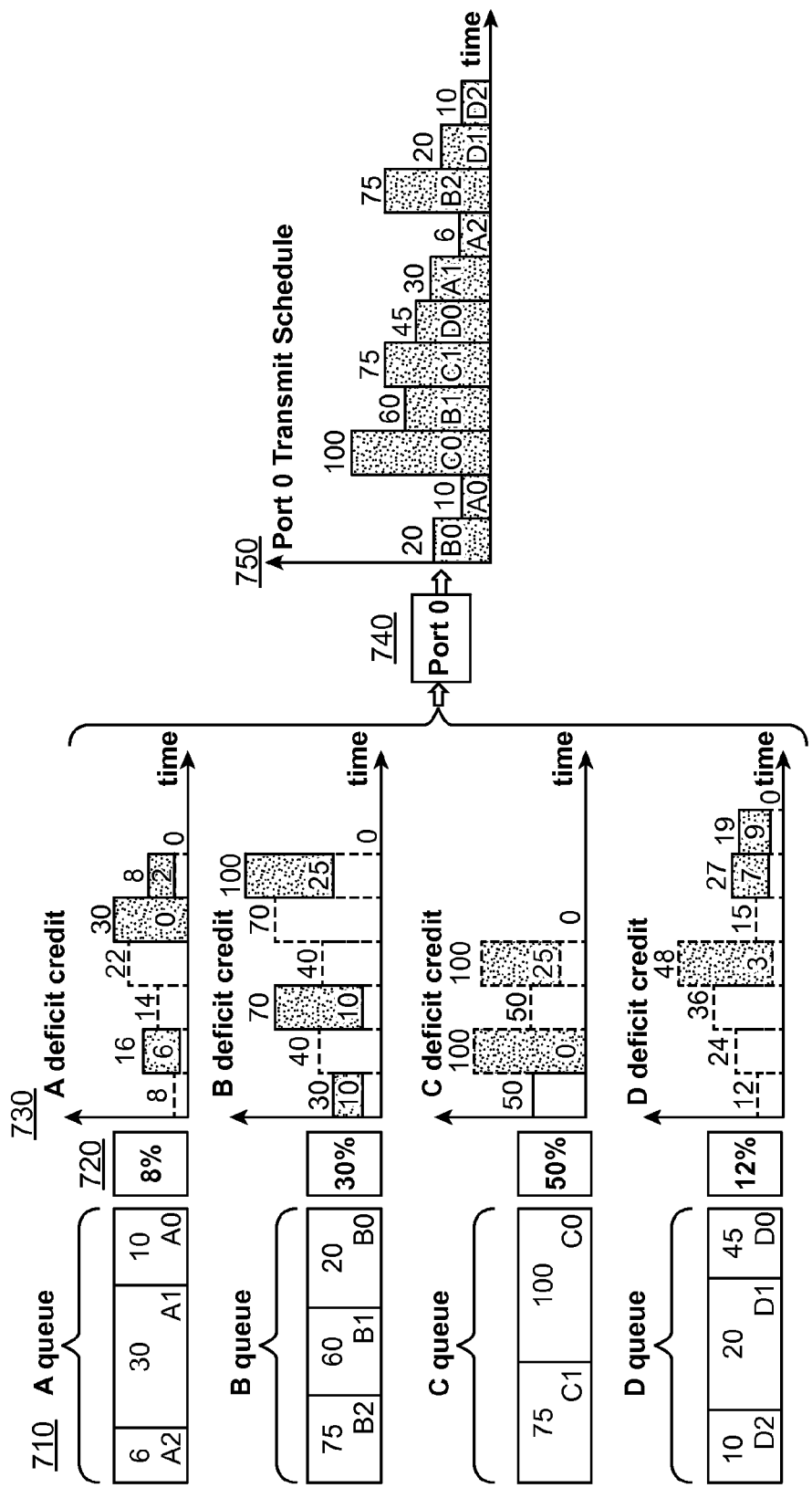
FIG. 7 shows an example of the bandwidth selective weighted DRR process employed by the disclosed packet scheduler of FIG. 4, in accordance with at least one embodiment of the present disclosure.

FIG. 7 shows an example of the bandwidth selective weighted DRR process employed by the disclosed packet scheduler of FIG. 4, in accordance with at least one embodiment of the present disclosure. In particular, this figure illustrates an example of the bandwidth selective weighted round robin process, where queues A, B, C, and D 710 are assigned to transmit through Port 0 740, and each queue is assigned a percentage of Port 0 740 bandwidth as indicated in boxes 720. The bandwidth is proportioned by assigning a round robin deficit credit (DC) to each queue that is proportional to the allotted bandwidth, so a queue receiving twice the bandwidth of another queue would receive twice the number of DC at each round. Here, for illustration, the number of DC received by each queue is the same as the bandwidth percentages, but in practice, it would be a multiple of the bandwidth percentages that depends on the port capacity. The queue DC must be greater than the required head of the queue (HoQ) packet DC for the packet to be sent, otherwise, the queue DC is increased until it exceeds the HoQ packet length, in bytes. Upon sending a packet, the queue DC credit is decreased by the packet length, in bytes.

The DC required to send a packet in each queue 710 are indicated by the numbers above the packet identification (ID). The bandwidth weighted round robin deficit credit DC for each queue are shown on the vertical axes of graphs 730 as a function of time on the horizontal axes. The dotted lines and associated numbers indicate the queue DC before a packet has been sent. If a packet has been sent from the queue, the lower line and associated number indicates the queue DC after the packet is sent, and the shaded region represents the packet DC. The Port 0 packet transmit schedule 750 shows the time sequence of packets sent by packet ID and packet DC size.

In this example, the bandwidth weighted round robin starts with queue A being assigned 8 DC. Since this DC value is insufficient to send the HoQ packet A0, which requires 10 DC, the round robin proceeds to queue B, and assigns it 30 DC, which is greater than the HoQ packet B0 requirement of 20 DC, so packet B0 is sent, as shown in the Port 0 transmit schedule 750. After sending packet B0, queue B has 10 remaining DC. The round robin proceeds to queues C and D, assigning them 50 and 12 DC, respectively, which are insufficient to send the HoQ packets C0 and D0, which require 100 and 45 DC, respectively. When the round robin returns to queue A, queue A is assigned 8 additional DC, giving it a total of 16 DC, which is greater than the HoQ packet A0 requirement of 10 DC, so packet A0 is sent, as shown in the Port 0 transmit schedule 750. After sending packet A0, queue A has 6 remaining DC. The round robin proceeds to queue B, assigning it an additional 30 DC, giving it a total of 40 DC, which is insufficient to send the HoQ packet B1, which requires 60 DC. The round robin proceeds to queue C assigning it an additional 50 DC, giving it a total of 100 DC, which is equal to the HoQ packet C0, which requires 100 credits, so packet C0 is sent, as shown in the Port 0 transmit schedule 750. After sending packet C0, queue C has 0 remaining credits. The round robin proceeds to queues D and A, assigning them additional DC of 12 and 8, giving them 24 and 14 DC, respectively, which are insufficient to send the HoQ packets D0 and A1, which require 45 and 30 credits, respectively. When the round robin reaches queue B, it assigns it an additional 30 DC, giving it a total of 70 DC, which is sufficient to send HoQ packet B1, which requires 60 DC, so packet B1 is sent, as shown in the Port 0 transmit schedule 750. After sending packet B1, queue B has 10 remaining DC. The round robin proceeds to queue C, assigning it an additional 50 DC, for a total of 50 DC that is insufficient to send HoQ packet C1, which requires 75 DC.

The round robin then proceeds to queues D, A, and B giving them an additional 12, 8, and 30 DC, for totals of 36, 22, and 40 DC, respectively, that are insufficient to send HoQ packets D0, A1, and B2, which require 45, 30, and 75 DC, respectively. When the round robin reaches queue C, it assigns it an additional 50 DC, giving it a total of 100 DC which is sufficient to send the HoQ packet C1, which requires 75 DC, so packet C1 is sent, as shown in the Port 0 transmit schedule 750. After sending packet C1, queue C has 0 remaining DC, and its queue is empty. Empty queues are assigned 0 DC even if they have remaining DC. When the round robin reaches queue D and assigns it an additional 12 DC, and it has a total of 48 DC, which is sufficient to send HoQ packet D0, which requires 45 DC, so packet D0 is sent, as shown in the Port 0 transmit schedule 750. After sending packet D0, queue D has 3 remaining DC. The round robin proceeds to queue A, and assigns it an additional 8 DC, giving it a total of 30 DC, which is sufficient to send HoQ packet A1, which requires 30 DC, so packet A1 is sent, as shown in the Port 0 transmit schedule 750. After sending packet A1, queue A has 0 remaining DC. Next the round robin goes to queue B and assigns it an additional 30 DC, giving it a total of 70 DC which is insufficient to send HoQ packet B2, which requires 75 DC. The round robin bypasses queue C, which is now empty, and goes to queue D, assigning it an additional 12 DC, giving it a total of 15 DC, which is insufficient to send HoQ packet D1, which requires 20 DC.

When the round robin proceeds to queue A, assigning it an additional 8 DC, it has a total of 8 DC, which is sufficient to send HoQ packet A2, which requires 6 DC, so packet A2 is sent, as shown in the Port 0 transmit schedule 750. After sending packet A2, queue A has 2 remaining DC, but since queue is now empty, its DC is set to zero. The round robin proceeds to queue B, assigning it an additional 30 DC, giving it a total of 100 DC which is sufficient to send HoQ packet B2, which requires 75 DC, so packet B2 is sent, as shown in the Port 0 transmit schedule 750. After sending packet B2, queue B has 25 remaining DC, but since queue is now empty, its DC is set to zero. Again, the round robin bypasses queue C which is empty and assigns queue D an additional 12 DC, giving it a total of 27 DC, which is sufficient to send HoQ packet D1, so packet D1 is sent, as shown in the Port 0 transmit schedule 750. After sending packet D1, queue D has 7 remaining DC. Since all the other queues are empty, the round robin repeats queue D, assigning it an additional 12 DC, giving it a total of 19 DC, which is sufficient to send HoQ packet D2, so packet D2 is sent, as shown in the Port 0 transmit schedule 750. After sending packet D2, queue D has 9 remaining DC, but since queue is now empty, its DC is set to zero, thereby emptying all the queues. It should be noted that in this example, the queues were not replenished, but in practice they would be constantly refilled.

Accordingly, the present disclosure may be realized in hardware, software, or a combination of hardware and software. Embodiments may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in and/or controlled by a computer program product, comprising instructions stored on a non-transitory computer-readable storage medium, which comprises all the features enabling the implementation of the methods described herein, and which when loaded in and executed by a particular computer system is able to carry out these methods. Computer program in the present context means any expression, in any language, code or notation, of a set of instructions intended to cause a system having an information processing capability to perform a particular function either directly or after either or both of the following: 1.) conversion to another language, code or notation; 2.) reproduction in a different material form.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of embodiments exist, each differing from others in matters of detail only. Accordingly, it is intended that the embodiments shall be limited only to the extent required by the appended claims and the rules and principles of applicable law.

We claim:

1. A method for data packet scheduling, the method comprising:
    mapping a flow of a data packet to a port;
    writing a length of the data packet to a packet length storage unit;
    selecting the flow of the data packet to be one of a strict priority (SP) flow and a weighted deficit round robin (DRR) flow;
    providing, by a priority scheduler, the data packet to be transmitted, in accordance with the selected flow of the data packet;
    transmitting the entire data packet, in accordance with the selected flow of the data packet, when partial packet transmissions are disabled; and
    transmitting a portion of the data packet, in accordance with the selected flow of the data packet, when the partial packet transmissions are enabled, and pushing an untransmitted portion of the data packet from the priority scheduler back into the packet length storage unit.

2. The method of claim 1, further comprising selecting a transmission port from which to transmit the data packet, wherein the transmission port is the port to which the flow of the data is mapped.

3. The method of claim 2, further comprising transmitting at least a portion of the data packet to the transmission port, if the flow of the data packet is selected to be a SP flow, when the data packet is in front of a SP queue and no other data packet is already in transit on the transmission port.

4. The method of claim 2, further comprising transmitting at least a portion of the data packet to the transmission port, if the flow of the data packet is selected to be a DRR flow, when a DRR dequeuing module determines the data packet is to be transmitted, no other data packet with a SP flow is mapped to the transmission port, and no other data packet is already in transit on the transmission port.

5. The method of claim 1, further comprising transmitting the entire data packet to the transmission port, if entire data packet transmission is selected.

6. The method of claim 1, wherein the packet length storage contains separate first-in-first-out (FIFO) units for each flow.

7. The method of claim 1, wherein each of the at least one port has an active list that contains a list of DRR flows that are mapped to the port and have data packets available for transmission.

8. The method of claim 1, when more than one DRR flow is mapped to the port, the method further comprises selecting fractions of bandwidth of the port mapped to the DRR flows to be allocated to each of the DRR flows.

9. A data packet scheduler comprising:
    a packet length storage unit configured to store a length of a data packet to be transmitted;
    an interface scheduler, connected to the packet length storage, configured to select a port from a plurality of ports from which to transmit the data packet;
    a configuration register configured to selectively enable and disable partial packet transmissions; and
    a priority scheduler, connected to the interface scheduler, configured to select a flow for the data packet, transmit the entire data packet to the port in accordance with a selected flow of the data packet, when the partial packet transmissions are disabled, transmit a portion of the data packet to the port in accordance with the selected flow of the data packet, when the partial packet transmissions are enabled, and to push an untransmitted portion of the data packet back into the packet length storage unit, wherein the priority scheduler includes a strict priority (SP) scheduler and a weighted deficit round robin (DRR) scheduler.

10. The data packet scheduler of claim 9, wherein the data packet is mapped to a flow.

11. The data packet scheduler of claim 10, wherein the flow of the data packet is one of a SP flow and a DRR flow.

12. The data packet scheduler of claim 10, wherein the flow is mapped to at least one of the plurality of ports.

13. The data packet scheduler of claim 9, wherein an egress processor provides the data packet to the data packet scheduler to be transmitted.

14. The data packet scheduler of claim 9, wherein the SP scheduler contains at least one SP scheduling queue for queuing one SP flow for transmission.

15. The data packet scheduler of claim 9, wherein the DRR scheduler contains a dequeuing module for dequeuing more than one DR R flow for transmission.

16. The data packet scheduler of claim 9, wherein the DRR scheduler is to perform weighted fair queuing that allows for more than one DRR flow to share bandwidth of one port of the plurality of ports according to a weighted fair manner.

17. The data packet scheduler of claim 9, wherein the packet length storage unit contains separate first-in-first-out (FIFO) units for each flow.

18. The data packet scheduler of claim 9, wherein each of the plurality of ports has an active list that contains a list of DRR flows that are mapped to the port and have data packets available for transmission.

19. The data packet scheduler of claim 9, wherein when the entire data packet transmission is selected for the data packet, the priority scheduler is to transmit all of the data pack.

20. The data packet scheduler of claim 9, wherein the SP scheduler has priority over the weighted DRR scheduler.

\* \* \* \* \*

UNITED STATES PATENT AND TRADEMARK OFFICE
CERTIFICATE OF CORRECTION

PATENT NO.        : 8,943,236 B1                                             Page 1 of 1
APPLICATION NO.   : 13/166749
DATED             : January 27, 2015
INVENTOR(S)       : Ozair Usmani It is certified that error appears in the above-identified patent and that said Letters Patent is hereby corrected as shown below:

In the Claims

Column 13, line 9, please replace "DR R" with --DRR--.

Signed and Sealed this
Eleventh Day of August, 2015

Michelle K. Lee
*Director of the United States Patent and Trademark Office*